US008142008B2

(12) United States Patent
Takabayashi et al.

(10) Patent No.: US 8,142,008 B2
(45) Date of Patent: Mar. 27, 2012

(54) IMAGE FORMING METHOD

(75) Inventors: Toshiyuki Takabayashi, Tokyo (JP); Hirotaka Iijima, Tokyo (JP); Akio Maeda, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 38 days.

(21) Appl. No.: 12/605,419

(22) Filed: Oct. 26, 2009

(65) Prior Publication Data

US 2010/0112497 A1 May 6, 2010

(30) Foreign Application Priority Data

Nov. 4, 2008 (JP) ................................ 2008-282952

(51) Int. Cl.
*G01D 11/00* (2006.01)

(52) U.S. Cl. .......................... 347/100; 347/102; 347/96

(58) Field of Classification Search .................. 347/100, 347/95, 96, 102, 101; 106/31.6, 31.13, 31.27; 523/160, 161
See application file for complete search history.

(56) References Cited

U.S. PATENT DOCUMENTS

2005/0287476 A1* 12/2005 Ishikawa et al. ........... 430/281.1
2006/0178449 A1* 8/2006 Tsuchimura et al. ......... 523/160
2007/0076042 A1 4/2007 Makuta et al.
2007/0076070 A1* 4/2007 Makuta et al. ................ 347/100
2007/0229637 A1* 10/2007 Makuta et al. ................ 347/100
2008/0192103 A1* 8/2008 Daems et al. ................. 347/102

FOREIGN PATENT DOCUMENTS

EP 1905609 4/2008
EP 1905611 4/2008
JP 2000186243 7/2000
JP 2001115067 4/2001
JP 2003285546 10/2003
JP 2008105253 5/2008
JP 2008105387 5/2008

* cited by examiner

*Primary Examiner* — Manish S Shah
(74) *Attorney, Agent, or Firm* — Lucas & Mercanti, LLP

(57) ABSTRACT

A method for forming an image with an ink-jet recorder provided with an ink-jet head, the method including the following steps in the sequence set forth: ejecting a photo-acid generator solution through the ink-jet head on a recording material, provided that the photo-acid generator solution contains a solvent and a photo-acid generator without containing a photopolymerizable compound; irradiating the ejected photo-acid generator solution on the recording material with actinic radiation rays; ejecting an actinic radiation curable ink containing a colorant through the ink-jet head on the recording material to form an image; and irradiating the image with actinic radiation rays so as to fix the formed image.

6 Claims, 4 Drawing Sheets

IMAGE FORMING METHOD

This application is based on Japanese Patent Application No. 2008-282952 filed on Nov. 4, 2008 with Japan Patent Office, the entire content of which is hereby incorporated by reference.

TECHNICAL FIELD

The present invention relates to an image forming method using an ink-jet recording method.

BACKGROUND

Recently, the ink-jet recording method has been applied to various printing fields such as photography, various kinds of printings, and special printings such as marking and color filters because the ink-jet recording method can produce an image simply and at low cost.

Particularly, an image quality almost equal to a silver halide photograph can be obtained by the following means: a recorder which enables to jet and to control a fine dot; an ink having improved properties of color reproduction area, durability, and jetting property; and an exclusive paper in which the absorptivity of the ink, coloring property of the coloring material, surface glossiness are greatly increased.

The improvement of the image quality of today's ink-jet recording method is attained only when all of the recorder, ink, and the exclusive paper are get together.

However, for the ink-jet system which requires exclusive papers, the limitation of the recording material and the cost increase of the recording material become a problem. Accordingly, many trials have been made to record onto the recording material different from the exclusive paper using the ink-jet method. They are, for example, a phase change ink-jet system using a solid wax ink at a room temperature, a solvent type ink-jet system using a quick dry type organic solvent as a main component, or a UV ink-jet system in which a cross-linkage is formed by an ultraviolet (UV) ray after recording.

An actinic radiation curable composition which is cured with an active energy radiation such as a ultraviolet ray and an electron beam, is put in practical use of various applications, such as coating materials (for a plastic, a paper, a woodwork and an inorganic material), an adhesive agent, a printing ink, a print circuit board and an electric insulation. And as an ink-jet ink system which uses these polymerizable compositions, an ultraviolet ray curable ink-jet ink which is hardened by an ultraviolet ray is well known. The ink-jet recording method using the ultraviolet ray curable ink has been attracting attention in recent years from the point that it dries quickly and it can perform recording to a recording material having no ink absorptivity.

Moreover, there were introduced attempts for forming an image on various recording materials by using a mechanism in which a first ejected liquid and the subsequently ejected liquid are allowed to react to result in aggregation of a colorant (for example, refer to patent documents 1). However, it is hard to obtain a glossy image using this composition because the image is produced by the aggregated colorant. Furthermore, there was disclosed a method for forming an image using an aqueous ultraviolet ray curable ink (for example, refer to patent documents 2). However, when the aqueous ultraviolet ray curable ink was used, the hardening property (drying characteristics) of the first ejected ink became insufficient at the time of the reaching of the later ejected ink on the target of the hardened membrane (polymerized film), and there were problems, such as inferior adhesion of the liquids.

Moreover, there was introduced another image forming method, in which an actinic radiation curable ink containing a photoinitiator and a photo-polymerizable compound but containing no colorant (or containing substantially no colorant) was coated on an entire surface of a recording material including non-image forming area with a roll coater or was applied with an ink-jet method prior to applying an ink containing a colorant on the recording material. Subsequently, the applied actinic radiation curable ink was semi-cured by irradiation with actinic radiations, then the ink containing a colorant was ejected on the semi-cured first ink to form a an image (for example, refer to patent document 3). By this image formation method, since the degree of curing tends to change depending on the effect of the recording environment (temperature and humidity) or on the difference of the amount of inks which form each image, it is difficult to reproduce a semi-cured condition with high repeatability, and, as a result, a high-definition image cannot be created.

In addition, as the same image forming method as described in the patent document 3, the following patent documents can be cited: Japanese patent application publication open to public inspection (JP-A) Nos. 2008-105382, 2008-23980, 2008-105378, 2008-105379 and 2008-100501.

There was introduced another image forming method in which an actinic radiation curable ink containing no colorant (but containing a photoinitiator and a photo-polymerizable compound) was imagewise ejected on the recording material prior to ejecting an ink containing a colorant, then, without applying an actinic radiation, the ink containing a colorant was ejected (for example, refer to patent document 4). In this image forming method, deterioration of an image caused by coalescence of adjacent dots which may be a problem during high-speed printing cannot be fully inhibited. As a result, it is hard to form a high-definition image. Especially, when an image is formed with very minute ink droplets of 0.1 to 4.0 pl, the deterioration of an image caused by coalescence of adjacent dots will become significant.

In addition, as the same image forming method as described in the patent document 4, the following patent documents can be cited: JP-A Nos. 2008-105254, 2007-313839, 2007-314734, 2007-254560, 2007-237405 and 2007-231206.

There was introduced an image forming method in which a first actinic radiation curable ink (containing a photoinitiator and a polymerizable compound) without substantially containing no colorant is ejected on a recording material, and then it is cured by irradiation with actinic rays. Subsequently, a second ink containing a colorant is ejected on the cured first ink. And again, the image is cured and fixed by irradiation with actinic rays (for example, refer to patent document 5). With this image forming method, deterioration of an image caused by coalescence of adjacent dots which may be a problem during high-speed printing cannot be fully inhibited. As a result, it is hard to form a high-definition image.

Patent Document 1: Japanese Patent Application Publication open to public inspection (JP-A) No. 2001-115067
Patent Document 2: JP-A No. 2000-186243
Patent Document 3: JP-A No. 2008-105387
Patent Document 4: JP-A No. 2008-105253
Patent Document 5: JP-A No. 2003-285546

SUMMARY

An object of the present invention is to provide an image forming method enabling to form a high-definition image with high repeatability without coalescence of adjacent dots.

The above-described object of the present invention can be achieved by the following embodiments.

(1) An embodiment of the present invention is a method for forming an image with an ink-jet recorder provided with an ink-jet head, the method comprising the following steps in the sequence set forth:

ejecting a photo-acid generator solution through the ink-jet head on a recording material, provided that the photo-acid generator solution contains a solvent and a photo-acid generator without containing a photopolymerizable compound;

irradiating the ejected photo-acid generator solution on the recording material with actinic radiation rays;

ejecting an actinic radiation curable ink containing a colorant through the ink-jet head on the recording material to form an image; and irradiating the image with actinic radiation rays so as to fix the formed image.

(2) Another embodiment of the present invention is a method described in the aforesaid item (1), wherein the solvent contained in the photo-acid generator solution is a cyclic ester compound.

(3) Another embodiment of the present invention is a method described in the aforesaid items (1) or (2), wherein the photo-acid generator solution has a viscosity of 1 to 13 mPa·s measured at 25° C.; and the actinic radiation curable ink has a viscosity of 15 to 50 mPa·s measured at 25° C.

(4) Another embodiment of the present invention is a method described in any one of the aforesaid items (1) to (3), wherein the photo-acid generator is represented by Formula (1) or Formula (2).

Formula (1)

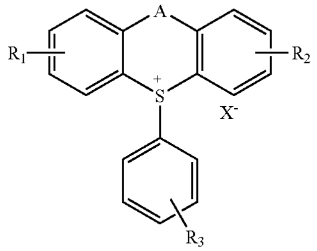

Formula (2)

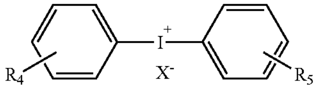

In Formulas (1) and (2), A represents S, O or CO; $R_1$ and $R_2$ each independently represent H, a straight alkyl group or a branched alkyl group having 1 to 6 carbon atoms, a cycloalkyl group, an alkoxyl group, a hydroxyl group, a halogen atom; an alkylthio group, and an arylthio group; $R_3$ to $R_5$ each independently represent a straight alkyl chain group or a branched alkyl chain group having 1 to 6 carbon atoms, an alkoxyl group, an aryl group which may have a substituent, a hydroxyl group, a halogen atom; and X represents $SbF_6$, $PF_6$, $AsF_6$, $BF_4$, or the following group.

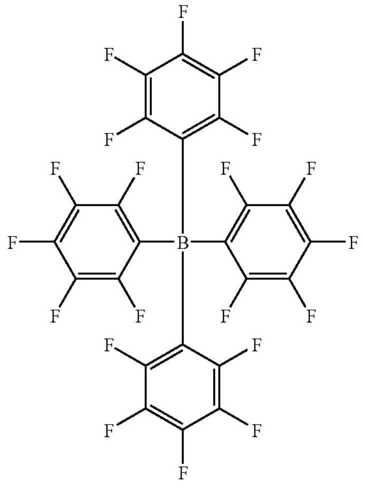

(5) Another embodiment of the present invention is a method described in any one of the aforesaid items (1) to (4), wherein an ejected amount of the photo-acid generator solution on the recording material is from 0.5 to 4.0 g/m$^2$.

(6) Another embodiment of the present invention is a method described in any one of the aforesaid items (1) to (5), wherein the ink-jet recorder uses a line recording method and the method comprising the following steps in the sequence set forth:

imagewise ejecting the photo-acid generator solution through the ink-jet head on the recording material;

irradiating the imagewise ejected photo-acid generator solution on the recording material with actinic radiation rays;

ejecting the actinic radiation curable ink containing a colorant through the ink-jet head to the recording material to form an image, provided that an amount of the ejected actinic radiation curable ink is from 0.1 to 4.0 pl; and irradiating the image with actinic radiation rays so as to fix the formed image.

By the image forming method of the present invention, it has been enabled to form a high-definition image with high repeatability without coalescence of adjacent dots.

DESCRIPTION OF THE PREFERRED EMBODIMENT

Figure 1:
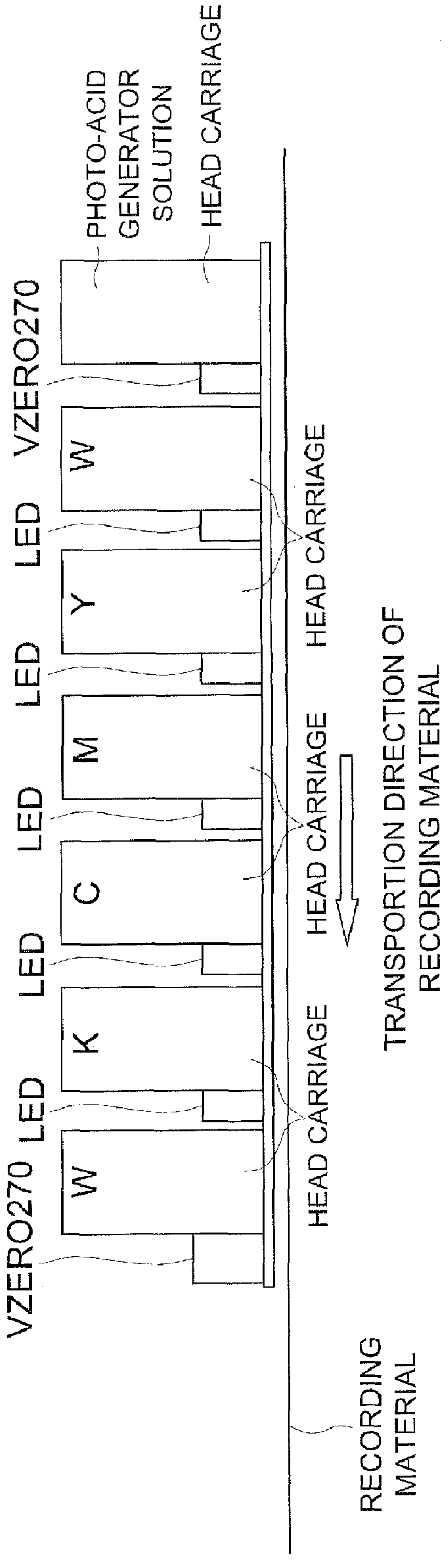
FIG. 1 is a side view showing an example of a constitution of the primary portion of an ink-jet recorder of the present invention using a line recording method.

The present invention will be detailed in the followings.

In the image forming method of the present invention using an ink-jet recorder provided with an ink-jet head, an image is formed by the following steps in the sequence set forth:

ejecting a photo-acid generator solution through the line ink-jet head on a recording material, provided that the photo-acid generator solution contains a solvent and a photo-acid generator without containing a photopolymerizable compound;

irradiating the ejected photo-acid generator solution on the recording material with actinic radiation rays;

ejecting an actinic radiation curable ink containing a colorant through the line ink-jet head on the recording material to form an image; and irradiation the image with actinic radiation rays so as to fix the formed image.

By the image forming method of the present invention, it is possible to form an image of high-definition with high repeatability by using a high speed ink-jet recoding method without coalescence of adjacent dots because the ejected inks containing a colorant are fixed at the moment when the ejected inks are landed on the recording material. Herein, a high speed ink-jet recoding method is a method enabling to print an image with a transportation speed of a recording material in the range of 30 m/s or more by using a line recording method, or with a printing speed of 50 $m^2$/hour by using a serial (shuttle) recording method. In particular, when a line recording method is used, plural ink dots tend to have a high possibility to land on a recording material almost simultaneously, the recording method of the present invention is most efficient to give an excellent effect.

In an ink composition containing a photo-radical generator as a photoinitiator, as are described in the above-mentioned Patent Documents, a radial species formed by irradiation with light will be deactivated through the reaction with oxygen in the air. As a result, coalescence of dots of the ink containing a colorant cannot be fully inhibited. Namely, when the following recording method is employed in which (i) a photo-radical generator solution having a photo-radical generator dissolved in a solvent is firstly ejected, then, (ii) the landed photo-radical generator solution on the recording material is irradiated with actinic radiation rays, subsequently, (iii) an actinic radiation curable ink containing a colorant is ejected to form an image, and then (iv) the formed image is again irradiated with actinic radiation rays, the radicals produced before landing the ink containing a colorant may be deactivated. Consequently, coalescence of dots of the ink containing a colorant cannot be fully inhibited. It was found in the present invention that a curing system (a cationic polymerization system) employing a photo-acid generator will extremely effective to form an image of high-definition with high repeatability.

When the following recording method is employed in which (i) a super strong acid (such as $HPF_6$) is at first ejected through an ink-jet recording head, then (ii) a curable ink containing a colorant is ejected to form an image, the ink-jet recording head tends to be corroded by a super strong acid. As a result, it is hard to form an image of high-definition with high repeatability. In the present invention, it was found that the following recording method will extremely effective to form an image of high-definition with high repeatability. The recording method of the present invention has a structure of: (i) firstly ejecting a photo-acid generator solution containing no colorant; then, (ii) irradiating with actinic radiation rays; and subsequently, (iii) ejecting an actinic radiation curable ink.

Further, in the image forming method of the present invention, the photo-acid generator solution substantially containing no colorant which is ejected firstly does not contain a polymerizable compound. The polymerizable compound used in the present invention will be described later. As is described in the above-mentioned Patent Documents, in the image forming method in which a liquid containing both a photoinitiator and a polymerizable compound but substantially containing no colorant is ejected prior to ejection of an actinic radiation curable ink containing a colorant, even if the foresaid liquid substantially containing no colorant is allowed to become a semi-cured condition before ejecting the actinic radiation curable ink containing a colorant, the printed matter finally produced will have a increased thickness. This will deteriorate the texture of the print, and it is hard to call it a print having a high grade quality. This deterioration of the texture of the print has become a major issue of a recording method using an actinic radiation curable ink. In the present invention, it was achieved an inventive recording method in which a photoinitiator solution containing no polymerizable compound was used. By using this method, the deterioration of an image quality caused by coalescence of dots was greatly avoided and the printed matter had no deterioration of the texture caused by increased thickness.

In the image forming method of the present invention, it is preferable that the photo-acid generator solution substantially containing no colorant is imagewise ejected on the recording material. Herein, "imagewise ejected" indicates a manner to eject the photo-acid generator solution only to a predetermined position which corresponds to the image data. The predetermined position may be the image region to be formed or slightly larger than the image region (about 120% area of the image region). This ejecting way is adopted to avoid yellowing (i.e. yellowing of the formed image) which may be caused by decomposition of the photo-acid generator irradiated with an excessive actinic radiation rays when the photo-acid generator is ejected to a non-image portion. When the photo-acid generator solution is ejected to a non-image position, the actinic radiation rays are further applied after ejection of an actinic radiation curable ink containing a colorant. As is described in the aforesaid Patent Documents, when a photo-radical generator solution (and containing a polymerizable compound) is ejected on a whole surface of the recording material prior to ejecting an actinic radiation curable ink containing a colorant, yellowing in a non-image portion will become specifically remarkable by the subsequent irradiation with actinic radiation rays. Consequently, the formed image is not acceptable for practical use.

In the present invention, it is preferable to form an image with a very small volume droplet of ink in the range of 0.1 to 4.0 pl. When the volume of droplet exceeds 4.0 pl, the printed mater after formation of an image may loose texture of high quality due to the increase of the thickness of the print. When an image is formed with ink droplets having a very small volume in the range of 0.1 to 4.0 pl, the total surface area of the ink droplets in relation to the volume of the ink droplets become increased. As a result, the deactivation by the reaction with oxygen in the air becomes remarkable in a system using a photo-radical generator, and the deterioration of image quality becomes large.

Based on the reasons thus described, one of the preferred embodiments of the present invention can be described as follows. However, the embodiment of the present invention is not limited to it. One of the preferred embodiments of the present invention has the following features: (a) ink-jet recording method is a line recording method; (b) firstly, a photo-acid generator solution is imagewise ejected on a recording material; (c) then, the photo-acid generator solution is imagewise ejected on the recording material, and then irradiated with actinic radiation rays; (d) an actinic radiation curable ink containing a colorant is ejected with an amount of ink droplet of 0.1 to 4.0 pl to form an image; and (e) the formed image is fixed by irradiation with actinic radiation rays.

A photo-acid generator solution used for the present invention will be described.

As a photo-acid generator, any photo-acid generating onium salts which are well known in the art and are described in such as "Application and Market of UV·EB Curing Technologies" (C. M. C Shyuppan, supervised by Yoneho Tabata/edited by Radotech Study Group) can be utilized. In the present invention, the photo-acid generator solution which is dissolved only in a solvent without coexistence of a polymerizable compound is used.

As a solvent for the photo-acid generator solution, any compounds which easily dissolve the photo-acid generator at a normal temperature (about 25±3° C.) can be used. However, a cyclic ester compound is desirable from the viewpoint of solubility for a photo-acid generator. Examples of a cyclic ester compound are cited as follows: β-propiolactone, β-butyrolactone, α-methyl-β-butyrolactone, γ-butyrolactone, γ-valerolactone, δ-valerolactone, ϵ-caprolactone, γ-caprolactone, γ-heptanolactone.

Preferable examples of a photo-acid generator used in a photo-acid generator solution are compounds represented by Formula (1) or Formula (2). The photo-acid generators having these structures will hardly produce yellowing and they are preferable. Specific examples are as follows, however, the present invention is not limited to them. The photo-acid generators of these structures are produced by Lamberti Corporation, Ciba Japan Corporation or Sun Chemical Company and they are available in the market.

(1)

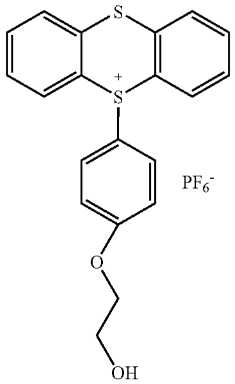

(2)

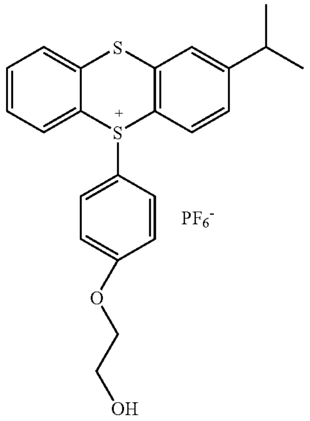

-continued (3)

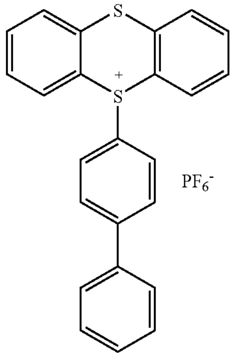

(4)

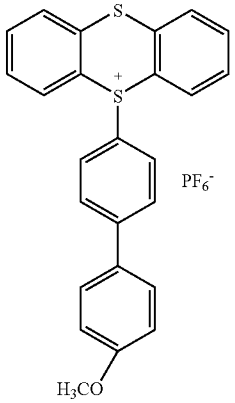

(5)

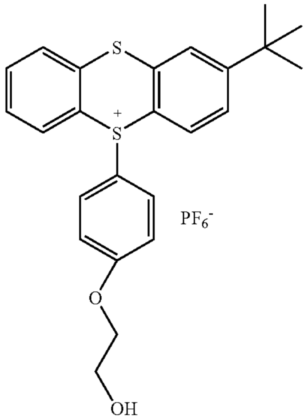

(6)

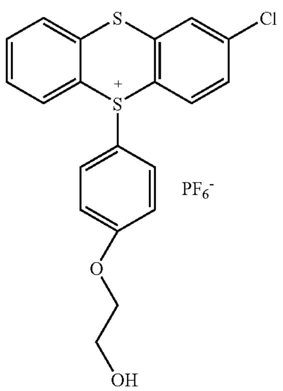

-continued
(7)
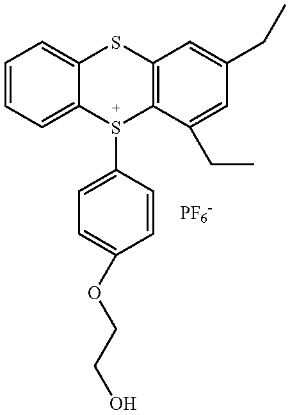
(8)
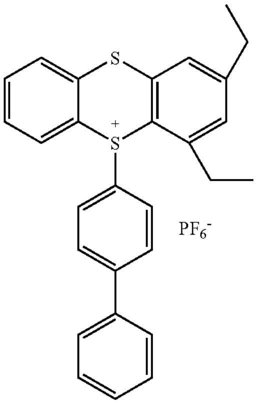
(9)
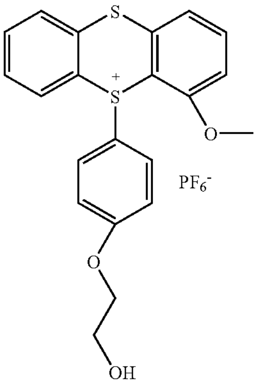
(10)
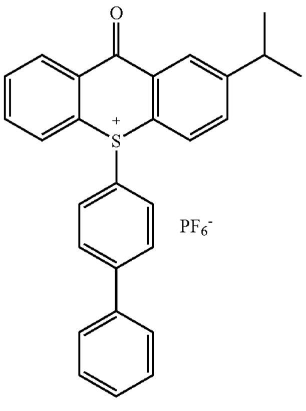
-continued
(11)
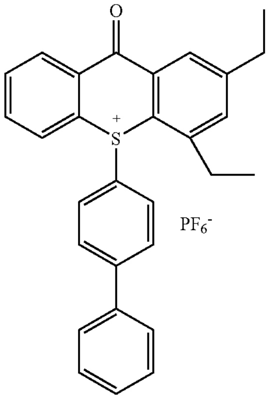
(12)
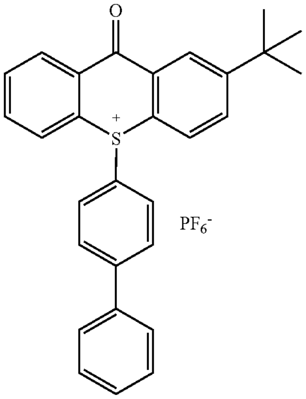
(13)
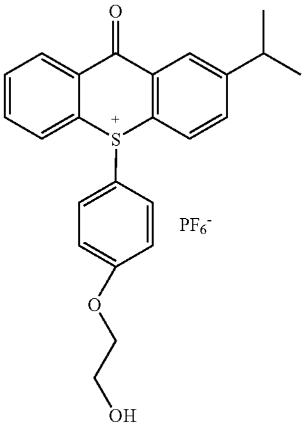
(14)
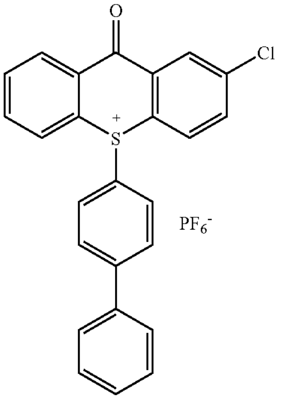

-continued (15)

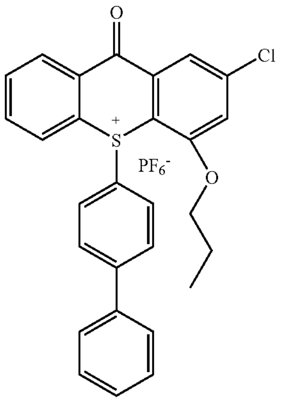

(16)

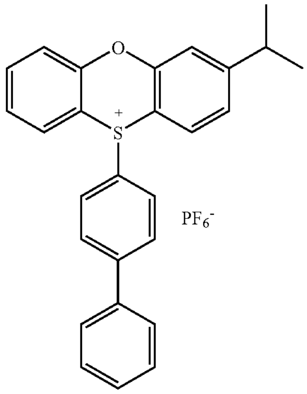

(17)

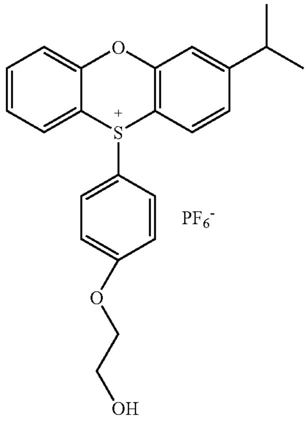

(18)

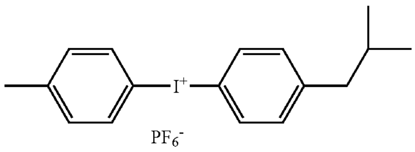

(19)

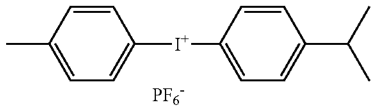

(20)

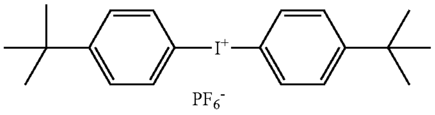

-continued (21)

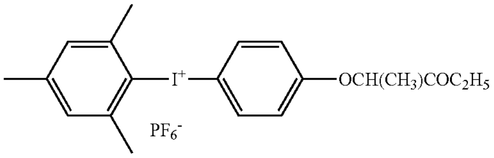

In order to form an image of high quality, the viscosity of the photo-acid generator solution is preferably in the range of 1 to 13 mPa·s measured at 25° C. by considering the relationship of an ink containing a colorant which is ejected after the photo-acid generator solution. When the viscosity of the photo-acid generator solution is too small (less than 1 mPa·s), coalescence of dots of the ink containing a colorant which is ejected after the photo-acid generator solution will easily occur, on the other hand, when it is too high (more than 13 mPa·s), stable ejection of the photo-acid generator solution will be hardly achieved.

It is preferable to control the amount of photo-acid generator solution ejected on the recording material to be in the range of 0.5 to 4.0 g/$m^2$ in order to form an image of high quality. Too much (more than 4.0 g/$m^2$) or too small (less than 0.5 g/$m^2$) amount of photo-acid generator solution will easily produce coalescence of dots.

From the viewpoint of minimizing the yellowing, the photo-acid generator solution of the present invention is preferably ejected imagewise.

Then, an actinic radiation curable ink of the present invention will be described.

An actinic radiation curable ink containing a colorant used in the present invention may be a mono color (for example, black). In the present invention, it may be possible to use four color inks (yellow, magenta, cyan, and black), five color inks (plus white), or seven color inks (plus light cyan and light magenta). An applied amount of a photo-acid generator solution is adjusted within the range as described above in accordance with the number of inks containing a colorant. When a single ink is used, the amount of a photo-acid generator solution is preferably from 0.5 to 1.5 g/$m^2$, when four or more inks are used, it is preferably from 1.5 to 4.0 g/$m^2$ in order to reduce coalescence of dots.

As a photoinitiator which is used in an actinic radiation curable ink containing a colorant of the present invention, the aforesaid photo-acid generator can be used.

As a polymerizable compound which is used in an actinic radiation curable ink containing a colorant of the present invention, all well-known cation polymerizable compounds can be used. Examples of cation polymerizable compounds include: a epoxy compound, an oxetane compound and a vinyl ether compound. It may be used a maleimide compound, a methacrylate compound or an acrylate compound in combination with a vinyl ether compound.

Examples of an epoxy compound used in the present invention include the following aromatic epoxides, alicyclic epoxides, and aliphatic epoxides.

An aromatic epoxy compound is preferably di- or polyglycidyl ether manufactured by a reaction of polyhydric phenol or an alkylene oxide adduct thereof with epichlorohydrin. Examples thereof include such as polyglycidyl ether of bisphenol A or an alkylene oxide adduct thereof, polyglycidyl ether of hydrogenated bisphenol A or an alkylene oxide adduct thereof and novolac type epoxy resin. Herein, alkylene oxide includes such as ethylene oxide and propylene oxide.

An alicyclic epoxy compound is preferably a compound containing cyclohexene oxide or cyclopentene oxide which is prepared by epoxidation of a compound having at least one cycloalkane ring such as a cyclohexene or cyclopentene ring by use of such as hydrogen peroxide and peracid.

An aliphatic epoxy compound is preferably di- or polyglycidyl ether of aliphatic polyhydric alcohol or an alkylene adduct thereof. Typical examples thereof include diglycidyl ether of alkylene oxide such as diglycidyl ether of ethylene glycol, diglycidyl ether of propylene glycol or diglycidyl ether of 1,6-hexanediol; polyglycidyl ether of polyhydric alcohol such as di- or tri-glycidyl ether of glycerin or alkylene oxide adduct thereof; and diglycidyl ether of polyalkylene glycol such as diglycidyl ether of polyethylene glycol or an alkylene oxide adduct thereof and diglycidyl ether of polypropylene glycol or an alkylene oxide adduct thereof. Herein, alkylene oxide includes ethylene oxide and propylene oxide.

Among these epoxy compounds, an aromatic epoxy compound and an alicyclic epoxy compound are preferable and an alicyclic epoxy compound is specifically preferable, in consideration of rapid curing ability.

An oxetane compound is a compound having an oxetane ring in the molecule. Utilizable oxetane compounds include any oxetane compound well known in the art such as those disclosed in JP-A Nos. 2001-220526 and 2001-310937.

Examples of a vinyl ether compound which can be used in the present invention include as follows: divinyl or trivinyl ether compound (such as ethylene glycol divinyl ether, diethylene glycol divinyl ether, triethylene glycol divinyl ether, propylene glycol divinyl ether, dipropyrene glycol divinyl ether, butanediol divinyl ether, hexanediol divinyl ether, cyclohexanedimethanol divinyl ether and trimethylolpropane trivinyl ether); monovinyl ether compound (such as ethyl vinyl ether, butyl vinyl ether, i-butyl vinyl ether, octadecyl vinyl ether, cyclohexyl vinyl ether, hydroxybutyl vinyl ether, 2-ethylhexyl vinyl ether, cyclohexanedimethanol monovinyl ether, propyl vinyl ether, i-propyl vinyl ether, i-propenyl ether-o-propylene carbonate, dodecyl vinyl ether, diethylene glycol monovinyl ether and octadecyl vinyl ether).

Among the above-described vinyl ether compounds, divinyl or trivinyl ether compound is preferable by considering curing property, adhesion and surface hardness. In particular, a divinyl ether compound is specifically preferable. In the present invention, one of the above-described vinyl ether compounds may be used singly or two or more compounds in the group may be jointly used. It may be possible to use a methacrylate compound, an acrylate compound, or a maleimide compound in combination with the aforesaid vinyl ether compound.

Examples of a methacrylate compound and an acrylate compound include:

a mono functional monomer such as isoamyl acrylate, stearyl acrylate, lauryl acrylate, octyl acrylate, decyl acrylate, isomyristyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyloxyethylphthalic acid, 2-acryloyloxyethyl-2-hydroxyethylphthalic acid, lactone modified flexible acrylate, t-butylcyclohexyl acrylate;

a bifunctional monomer such as triethylene glycol diacrylate, tetraethylene glycol diacrylate, polyethylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclo decane diacrylate, EO adducted bisphenol A diacrylate, PO adducted bisphenol A diacrylate, hydroxypivalic acid neo pentyl glycol diacrylate, polytetramethyle glycol diacrylate;

a polyfunctional monomer having trifunctional groups or more such as trimethylolpropane triacrylate, EO modified trimethylolpropane triacrylate, pentaerythritol triacrylate, pentaerythritol tetraacrylate, dipentaerythritol hexaacrylate, ditrimethylolpropane tetraacrylate, glycerin propoxy triacrylate, caprolactone modified trimethylolpropane triacrylate, pentaerythritolethoxy tetraacrylate, caprolactam modified dipentaerythritol hexaacrylate.

Further, a polymerizable oligomer can be used like as a monomer. Examples of a polymerizable oligomer include: epoxy acrylate, aliphatic urethane acrylate, aromatic urethane acrylate, polyester acrylate, a straight chain acrylics oligomer. From viewpoints of sensitization, skin irritation, eye irritation, mutagenicity and toxicity, the following compounds are preferable among the aforesaid monomers: isoamyl acrylate, stearyl acrylate, lauryl acrylate, octyl acrylate, decyl acrylate, isomyristyl acrylate, isostearyl acrylate, ethoxydiethylene glycol acrylate, methoxypolyethylene glycol acrylate, methoxypropylene glycol acrylate, isobornyl acrylate, lactone modified flexible acrylate, tetraethylene glycol diacrylate, polyethylene glycol diacrylate, polypropylene glycol diacrylate, EO modified trimethylolpropane triacrylate, dipentaerythritol hexaacrylate, ditrimethylolpropane tetraacrylate, glycerin propoxy triacrylate, caprolactone modified trimethylolpropane triacrylate, pentaerythritolethoxy tetraacrylate, caprolactam modified dipentaerythritol hexaacrylate.

Examples of a maleimide compound usable in the present invention include: N-methyl maleimide, N-propyl maleimide, N-hexyl maleimide, N-lauryl maleimide, N-cyclohexyl maleimide, N-phenyl maleimide, N,N'-methylene bis maleimide, polypropylene glycol bis(3-maleimide propyl)ether, tetraethylene glycol bis(3-maleimide propyl)ether, bis(2-maleimide ethyl)carbonate, N,N'-(4,4'-diphenylmethane)bis maleimide and N,N'-2,4-trilene bis maleimide. In addition, a polyfunctional maleimide compound produced by esterification of a maleimide carboxylic acid and a polyol compound and disclosed in JP-A No. 11-124403 can be used. However, the maleimide compounds used in the present invention are not limited to them.

An actinic radiation curable ink of the present invention contains at least one of the pigments well known in the art.

Examples of a pigment preferably utilized in the present invention will be listed below.

C. I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, 213;

C. I. Pigment Red 5, 7, 12, 22, 38, 48:1, 48:2, 48:4, 49:1, 53:1, 57:1, 63:1, 101, 112, 122, 123, 144, 146, 168, 184, 185, 202;

C. I. Pigment Violet 19, 23;

C. I. Pigment Blue 1, 2, 3, 15:1, 15:2, 15:3, 15:4, 18, 22, 27, 29, 60;

C. I. Pigment Green 7, 36;

C. I. Pigment White 6, 18, 21; and

C. I. Pigment Black 7.

Further, in the present invention, a white ink is preferably utilized in order to increase a color shielding effect with a transparent substrate such as plastic film. A white ink is specifically preferably utilized in soft package printing and label printing.

For dispersion of the above-described pigment, various mixing means such as a ball mill, a sand mill, an attritor, a roll mill, an agitator, a Henschel mixer, a colloidal mill, an ultrasonic homogenizer, a pearl mill, a wet jet mill and a paint shaker can be utilized. Further, a dispersant may be also added at the time of dispersion of pigment.

As a dispersant, preferably utilized is a polymer dispersant which includes Solsperse series by Avecia Corp. and PB series by Ajinomoto Finetechno Corp. Further, a synergist corresponding to various types of pigment as a dispersion aid can be also utilized. These dispersant and dispersion aid are preferably added at 1-50 weight parts against 100 weight parts of pigment.

A solvent or a photopolymerizable compound is utilized as a dispersion medium, however, as for actinic radiation curable ink utilized in the present invention, solventless is preferred since reaction and curing are performed immediately after ink landing. When a solvent remains in a cured image, there may cause a problem of deterioration of solvent resistance and a VOC problem of a residual solvent. Therefore, a dispersion medium is preferably not a solvent but a photopolymerizable compound, and monomer having the lowest viscosity among them is more preferably selected with respect to dispersion adaptability.

For dispersion of pigment, it is preferable to make the particle size of pigment particles of 0.08-0.5 μm, and selection of pigment, a dispersant and a dispersion medium; dispersion condition, and filtration condition are appropriately set so as to make the maximum particle size of 0.3-10 μm and preferably of 0.3-3 μm. By this particle size control, clogging of a head nozzle is depressed and storage stability, transparency and curing sensitivity of ink can be maintained.

In an actinic radiation curable ink of the present invention, pigment concentration is preferably 1-10 weigh % against the whole ink.

In an actinic radiation curable ink of the present invention, various kinds of additives can be added other than the above-described compounds. Examples of an additive include: a surfactant, a leveling additive, a matting agent, a compound to adjust film properties (such as a polyester resin, a polyurethane resin, a vinyl resin, an acrylic resin, a rubber resin, and a wax). Further, in order to improve storage stability of the ink, any well known basic compounds may be used. Typical examples of a basic compound include: a basic alkali metal compound, a basic alkali earth metal compound and a basic organic compound such as an amine.

In an actinic radiation curable ink of the present invention, a viscosity of the ink is preferably from 15 to 50 mPa·s at 25° C. to form an image of high quality. When the viscosity of the ink is too small (less than 15 mPa·s), coalescence of dots will easily occur, on the other hand, when it is too high (more than 50 mPa·s), stable ejection thereof will be hardly achieved.

<Ink Ejection Condition>

As an ink ejection condition of an ink containing a colorant of the present invention, ejection is preferably performed while a recording head and ink are heated at 35-100° C. with respect to keeping ejection stability. Since actinic radiation curable ink exhibits a large viscosity variation range due to temperature variation and the viscosity variation itself significantly influences a liquid drop size and a liquid drop ejection speed resulting in deterioration of image quality, it is necessary to increase ink temperature while keeping the ink temperature constant. The control range of ink temperature is preferably a set temperature ±5° C., preferably a set temperature ±2° C. and furthermore preferably a set temperature ±1° C.

<Light Irradiation Condition after Ink Landing>

In an image forming method of the present invention, as an irradiation condition of actinic radiations, actinic radiations are irradiated preferable within 0.001-1.0 second after ink landing and more preferably within 0.001-0.5 seconds. To form an image having a high-definition, it is specifically important that the irradiation timing is the faster.

An image forming method of a line recording method, with which the composition of the present invention is most effective, will be described.

Figure 2:
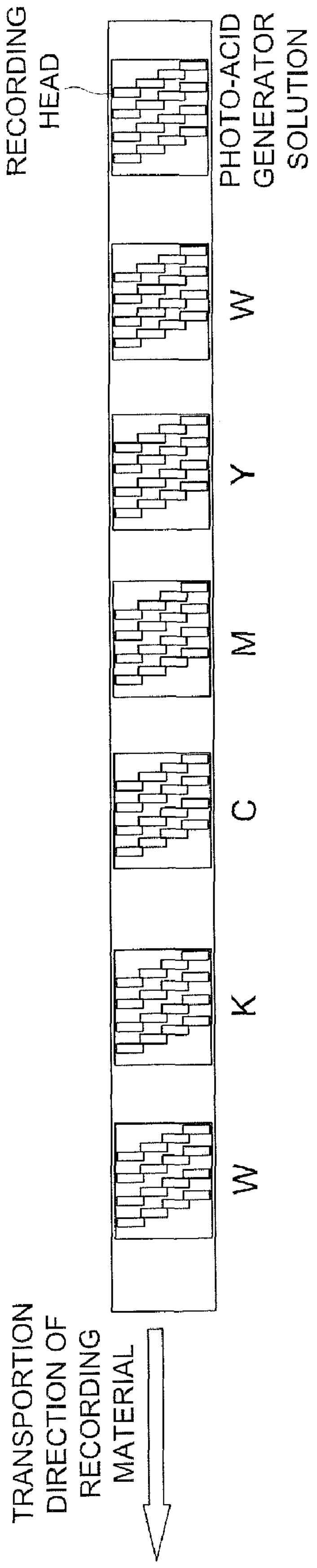
FIG. 2 is a top view showing an example of a constitution of the primary portion of an ink-jet recorder of the present invention using a line recording method.

FIG. 1 is a side view showing an example of a constitution of the primary portion of an ink-jet recorder, and FIG. 2 is a top view of the same.

An ink-jet recorder shown in FIGS. 1 and 2 is called as a line recording type, and a plurality of head carriages each containing a recording head for a photo-acid generator solution, and each colored ink is arranged in a fixed position so as to cover the whole width of a recording material. An image is formed on a recording material which is conveyed under the plurality of head carriages.

The number of the recording heads for each colors, which is arranged in a direction of the transportation direction of the recording material, varies depending on a nozzle density and required definition for printing. When an image having 1440×1440 dpi is required to produce using an ink droplet of 2 pl with a recording head of 360 dpi, the image of 1440×1440 dpi can be achieved by arranging four recording heads with an appropriate shift with respect to the direction of conveyance of the recording material. When an image having 720×720 dpi is required to produce using an ink droplet of 6 pl with a recording head of 360 dpi, the image of 720×720 dpi can be achieved by arranging two recording heads with an appropriate shift with respect to the direction of conveyance of the recording material. Herein, dpi indicates a dot number per 2.54 cm.

In the position of the downstream direction of the transportation of the recording material and beside the head carriage for a photo-acid generator solution, a metal halide lamp (VZero 270 in Fog. 1) is arranged so as to cover the whole width of a recording material. As soon as the photo-acid generator solution is landed on the recording material, an ultraviolet ray is irradiated with the aforesaid lamp.

Subsequently, the color inks are ejected one by one to form an image. After completing ejection of all of the color inks, the formed image is fully fixed with another metal halide lamp (VZero 270 in Fog. 1).

As a light source for irradiating the photo-acid generator solution and for irradiating the image after fully formed with all color inks, it is preferable to use a light source enabling to emit a high luminance UV light of 100 $mW/cm^2$ or more. Examples of such lamps include: a high-pressure mercury lamp, a metal halide lamp and an LED lamp. Among them, an LED lamp is preferably used because of its low consumption of electric power. However, the light source used in the present invention is not limited to an LED lamp. In addition, as is shown in FIG. 1, a plurality of LED lamps may be arranged between each color ink so as to cover the whole width of a recording material for the purpose of fixing the image of each color before completion of a full color image.

As a light source arranged between each color ink and used for irradiating each color ink, it is preferable to use a light source having a electric power consumption of less than 1 kW·hr such as a fluorescent lamp (a low-pressure mercury lamp, a germicidal lamp), a cold-cathode tube and an LED lamp. However, the light source used in the present invention is not limited to them.

Figure 3:
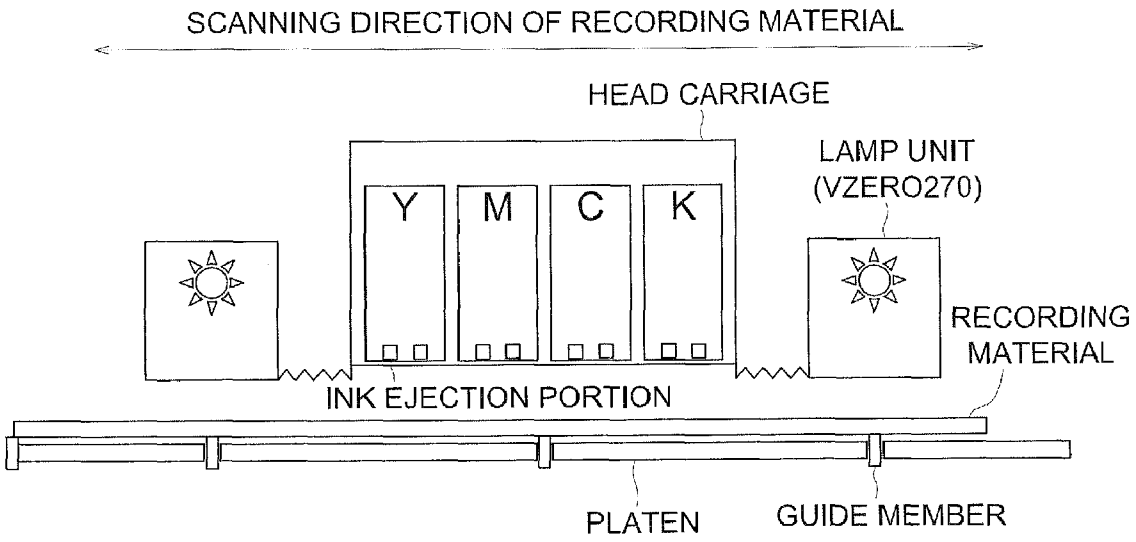
FIG. 3 is a front view showing an example of a constitution of the primary portion of an ink-jet recorder of the present invention using a serial (shuttle) recording method.
Figure 4:
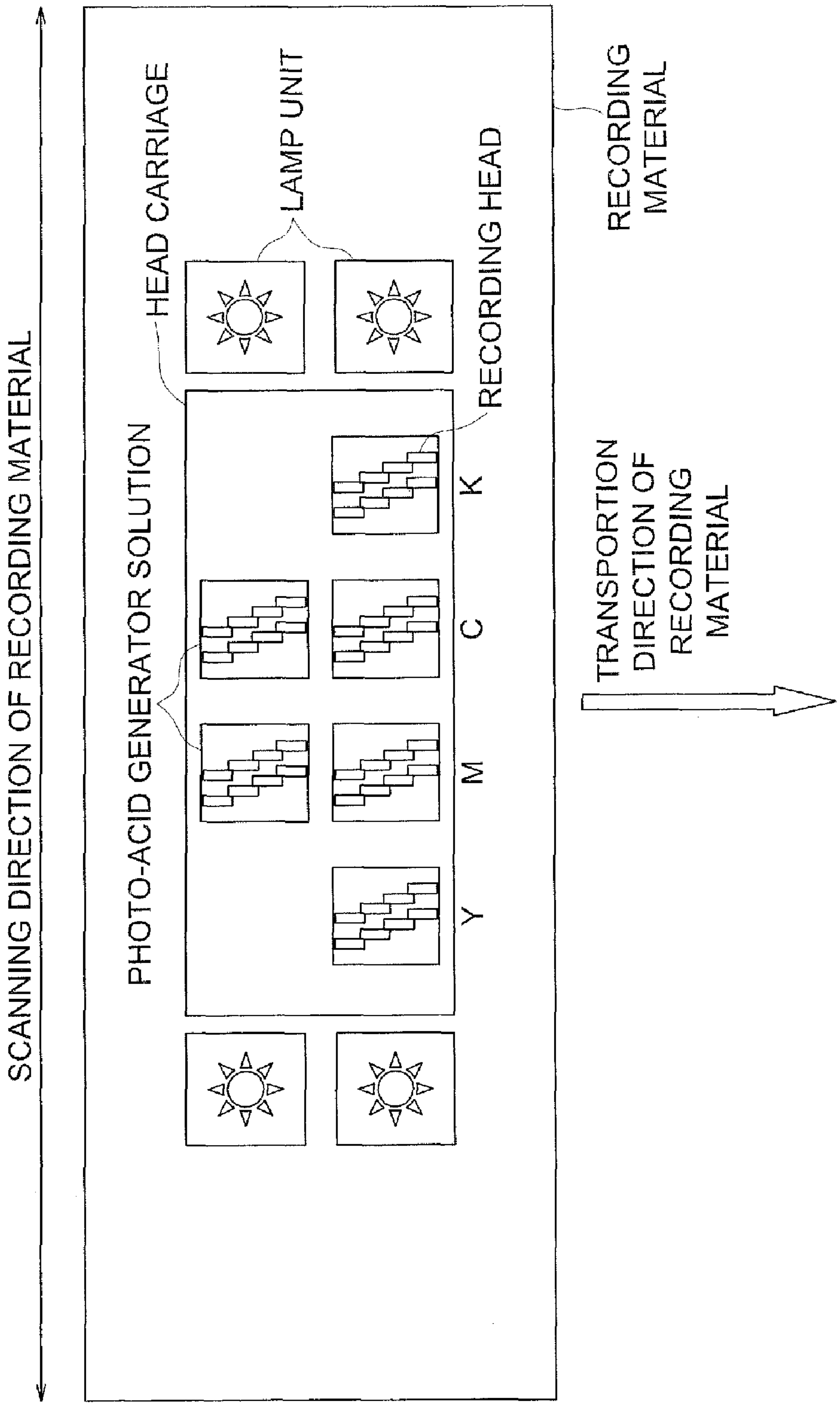
FIG. 4 is a top view showing an example of a constitution of the primary portion of an ink-jet recorder of the present invention using a serial (shuttle) recording method.

Next, an image forming method of a serial (shuttle) recording method will be described. FIG. 3 is a front view showing an example of a constitution of the primary portion of an ink-jet recorder, and FIG. 4 is a top view of the same.

When an image having 1440×1440 dpi is required to produce using an ink droplet of 2 pl with a recording head of 360 dpi, the image of 1440×1440 dpi can be achieved by arranging two recording heads per one color with an appropriate shift with respect to the direction of conveyance of the recording material. The image of 1440×1440 dpi can be produced by scanning twice at a maximum speed the recording carriage having the above-described arrangement.

At the both sides of the head carriage were provided with metal halide lamps (in this case, VZero 270) for a photo-acid generator solution and an ink containing a colorant. The photo-acid generator solution and the ink containing a colorant are ejected, while the recording head carriage is scanned. As soon as the photo-acid generator solution and the ink containing a colorant are landed on the recording material, they are irradiated with UV rays using the aforesaid lamps.

EXAMPLES

In the following, the present invention will be specifically explained referring to examples, however, embodiments of the present invention are not limited to these examples.

Example 1

[Treating Solution Containing No Colorant]

<Photo-Acid Generator Solution>

The following photo-acid generator solutions were used for evaluation.

PI-1: CPI-100P (made by San-Agro Limited; sulfonium salt dissolved in propylene carbonate), having a viscosity of 3 mPa·s PI-2: a mixture solution of 50 weight % of SPG (mage by Konica Minolta IJ Technologies, Inc.) and 50 weight % of propylene carbonate, having a viscosity of 3 mPa·s PI-3: a mixture solution of 50 weight % of DTS-102 (made by Mirodi Kagaku Co., Ltd.) and 50 weight % of γ-butyrolactone, having a viscosity of 3 mPa·s PI-4: ESACURE 1187 (made by Lamberti Corporation; propylene carbonate solution), having a viscosity of 7 mPa·s PI-5: a mixture solution of 50 weight % of Example compound (10) and 50 weight % of propylene carbonate, having a viscosity of 7 mPa·s PI-6: a mixture solution of 50 weight % of Irgacure 250 (made by Ciba Japan Corporation, dissolved in propylene carbonate) and 50 weight % of propylene carbonate, having a viscosity of 8 mPa·s PI-7: a mixture solution of 50 weight % of Example compound (20) and 50 weight % of propylene carbonate, having a viscosity of 7 mPa·s PI-8: a mixture solution of 50 weight % of Example compound (21) and 50 weight % of γ-butyrolactone, having a viscosity of 7 mPa·s

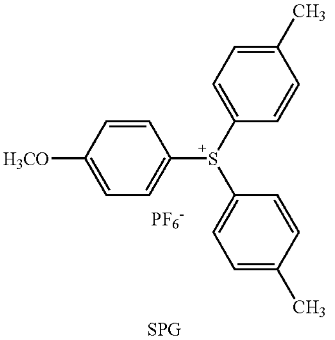

SPG

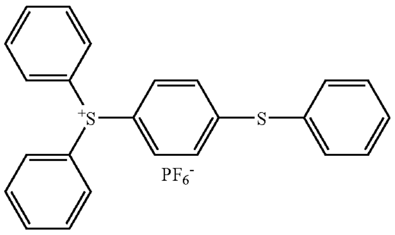

DTS - 102

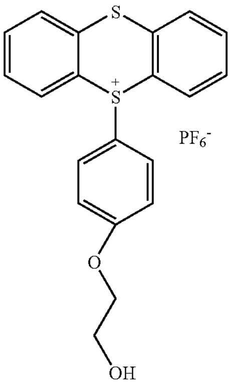

Esacure 1187

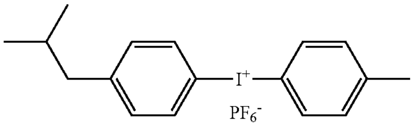

Irgacure 250
Propylene carbonate 75%

<Comparative Treating Solution>

The following treating solutions were employed as comparative treating solutions with respect to the above-described PI-1 to PI-8.

P-1: a mixture solution of 5 weight % of TPO-L (made by BASF Co. Ltd.; ethyl-2,4,6-trimethylbenzoyl phenyl phosphinate, photoinitiator), 93 weight % of 1,6-hexanediol diacrylate (made by Daicel-Cytec Co., Ltd., polymerizable compound) and 2 weight % of MEGAFAC F475 (DIC Corporation, fluorine containing surfactant)

P-2: a mixture solution of 5 weight % of TPO-L (made by BASF Co. Ltd.; ethyl-2,4,6-trimethylbenzoyl phenyl phosphinate, photoinitiator), 93 weight % of DPCA 60 (made by Nippon Kayaku Co., Ltd., polymerizable compound) and 2 weight % of MEGAFAC F475 (DIC Corporation, fluorine containing surfactant)

P-3: a mixture solution of 5 weight % of Irgacure 907 (made by Ciba Specialty Chemicals; 2-methyl-1-(4-methylthiophenyl)-2-morpholinopropane-1-one, photoinitiator), 93 weight % of dipropylene glycol diacrylate (made by Daicel-Cytec Co., Ltd., polymerizable compound) and 2 weight % of BYK 307 (Byk-Chemie Japan Co., Ltd., polysiloxane compound)

P-4: a mixture solution of 5 weight % of TPO-L (made by BASF Co. Ltd.; ethyl-2,4,6-trimethylbenzoyl phenyl phosphinate, photoinitiator), 93 weight % of diethyl phthalate (made by Wako Pure Industries, Ltd., high boiling solvent) and 2 weight % of MEGAFAC F475 (DIC Corporation, fluorine containing surfactant)

P-5: a mixture solution of 5 weight % of TPO-L (made by BASF Co. Ltd.; ethyl-2,4,6-trimethylbenzoyl phenyl phosphinate, photoinitiator), 93 weight % of dibutyl phthalate (made by Wako Pure Industries, Ltd., high boiling solvent) and 2 weight % of MEGAFAC F475 (DIC Corporation, fluorine containing surfactant)

P-6: a mixture solution of 5 weight % of TPO-L (made by BASF Co. Ltd.; ethyl-2,4,6-trimethylbenzoyl phenyl phosphinate, photoinitiator), 93 weight % of dibutyl sebacinate (made by Wako Pure Industries, Ltd., high boiling solvent) and 2 weight % of BYK 306 (Byk-Chemie Japan Co., Ltd., polysiloxane compound)

P-7: a mixture solution of 5 weight % of CPI-100P (made by San-Apro Limited.; sulfonium salt dissolved in propylene carbonate, photoinitiator), 94.8 weight % of OXT-221 (made by Toagosei Co., Ltd., polymerizable compound) and 0.2 weight % of X-22-4272 (made by Shin-Etsu Chemical Co., Ltd., modified silicon oil)

P-8: a mixture solution of 5 weight % of Irgacure 250 (made by Ciba Japan Corporation, dissolved in propylene carbonate, photoinitiator), 94.8 weight % of OXT-221 (made by Toagosei Co., Ltd., polymerizable compound) and 0.2 weight % of KF-351 (made by Shin-Etsu Chemical Co., Ltd., modified silicon oil)

P-9: a mixture solution of 50 weight % of Irgacure 907 (made by Ciba Specialty Chemicals; 2-methyl-1-(4-methylthiophenyl)-2-morpholinopropane-1-one, photoinitiator) and 50 weight % of propylene carbonate.

The above-described P-1 to P-9 each has a compositional feature as indicated below.

P-1 to P-3: radical polymerization system; photoinitiator+polymerizable compound P-4 to P-6: radical polymerization system; photoinitiator+high boiling solvent P-7 and P-8: cationic polymerization system; photo-acid generator+polymerizable compound P-9: radical polymerization system; photoinitiator solution (cyclic ester solvent)

[Actinic Radiation Curable Ink]

(Preparation of Pigment Dispersion)

Pigments were dispersed in the following compositions.

The following two compounds were placed in a beaker made of stainless steel and heated at 65° C. on a hot plate for 1 hour with stirring so as to dissolve them.

PB 824 (dispersing agent, made be Ajimonoto Fine-techno Co., Inc.) 9 parts by weight OXT-221 (made by Toagosei Co., Ltd.) 71 parts by weight After the dissolved mixture was cooled to a room temperature, the following pigment was added in an amount of 20 parts by weight with 200 g of zirconia beads into a glass bottle. The mixture was dispersed with a paint shaker for the time indicated as below. Then, the zirconia beads were eliminated from the mixture resulting to produce a pigment dispersion containing each pigment. By repeating this procedure, Pigment dispersions 1 to 5 were prepared.

Pigment 1: Pigment Black 7 (#52, made by Mitsubishi Chemical Corporation), 10 hours Pigment 2: Pigment Blue 15:4 (CHROMOFINE BLUE 6332JC, made by Dainichiseika Color & Chemicals Mfg. Co., Ltd.), 9 hours Pigment 3: Pigment Yellow 150 (E4GN-GTCH 20015, made by LANXESS K.K.), 8 hours Pigment 4: Pigment Red 122 (CHROMOFINE RED 6112JC, made by Dainichiseika Color & Chemicals Mfg. Co., Ltd.), 10 hours Pigment 5: Titanium oxide (anatase form: an average particle diameter 0.2 μm), 10 hours In order to prepare comparative actinic radiation curable inks, Pigment dispersions 6 to 10 were prepared in the same manner as preparing Pigment dispersions 1 to 5 except that OXT-221 (made by Toagosei Co., Ltd.) was replaced with the same amount of tetraethylene glycol diacrylate.

(Preparation of Ink Composition)

Actinic radiation curable inks each having a composition as indicated in Tables were prepared. The figures in each Table indicate an amount of each component in each ink (K, C, M, Y, and W) expressed in parts by weight. The colors of inks are designated as: K=Black; C=Cyan; M=Magenta, Y=Yellow, and W=White.

The prepared inks were filtered using a membrane filter of 3 μm made of TEFLON™ produced by ADVATEC Inc. The viscosities of the prepared inks are indicated on the top of the Table.

TABLE 1

| Actinic radiation | Viscosity of each color ink: | K | C | M | Y | W |
|---|---|---|---|---|---|---|
| | | Pigment No. | | | | |
| curable ink composition 1 | 19 to 21 mPa · s (at 25° C.) | 1 | 2 | 4 | 3 | 5 |
| Pigment dispersion | | 12.5 | 12.5 | 21.0 | 15.0 | 40.0 |
| Polymerizable compound | CELOXIDE 3000 (made by Daicel Chemical Industries, Ltd.) | 10.0 | 10.0 | 10.0 | 10.0 | 10.0 |
| Polymerizable compound | CELOXIDE 2021P (made by Daicel Chemical Industries, Ltd.) | 10.0 | 10.0 | 10.0 | 10.0 | 5.0 |
| Polymerizable compound | OXT-221 (made by Toagosei Co., Ltd.) | 42.3 | 42.3 | 38.8 | 44.8 | 29.8 |
| Polymerizable compound | EX 211 (made by Nagase Chemtex Corporation) | 10.0 | 10.0 | 5.0 | 5.0 | 0.0 |
| Polymerizable compound | E4030 (made by New Japan Chemical Co., Ltd.) | 10.0 | 10.0 | 10.0 | 10.0 | 10.0 |
| Surfactant | X-22-4272 (made by Shin-Etsu Chemical Co., Ltd.) | 0.2 | 0.2 | 0.2 | 0.2 | 0.2 |
| Photo-acid generator | UVI 6992 (made by Dow Chemical Company) | 4.0 | 4.0 | 4.0 | 4.0 | 4.0 |

TABLE 1-continued

| Actinic radiation | Viscosity of each color ink: | K | C | M | Y | W |
|---|---|---|---|---|---|---|
| | | Pigment No. | | | | |
| curable ink composition 1 | 19 to 21 mPa · s (at 25° C.) | 1 | 2 | 4 | 3 | 5 |
| Sensitizer | DBA (made by Kawasaki Kasei Chemicals, Ltd.) | 1.0 | 1.0 | 1.0 | 1.0 | 1.0 |

TABLE 2

| Actinic radiation curable ink composition 2 | Viscosity of each color ink: 27 to 31 mPa · s (at 25° C.) | K | C | M | Y | W |
|---|---|---|---|---|---|---|
| Pigment No. | | 1 | 2 | 4 | 3 | 5 |
| Pigment dispersion | | 12.5 | 12.5 | 21.0 | 15.0 | 40.0 |
| Polymerizable compound | Compound E: Alicyclic epoxy compound 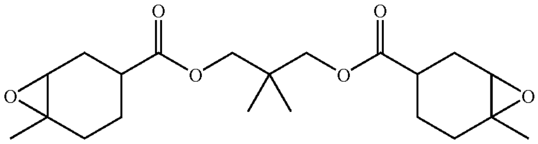 | 10.0 | 10.0 | 10.0 | 10.0 | 10.0 |
| Polymerizable compound | CELOXIDE 2021P (made by Daicel Chemical Industries, Ltd.) | 10.0 | 10.0 | 10.0 | 10.0 | 5.0 |
| Polymerizable compound | OXT-221 (made by Toagosei Co., Ltd.) | 44.0 | 44.0 | 40.5 | 46.5 | 31.5 |
| Polymerizable compound | EX 192 (made by Nagase Chemtex Corporation) | 10.0 | 10.0 | 5.0 | 5.0 | 0.0 |
| Polymerizable compound | E4030 (made by New Japan Chemical Co., Ltd.) | 10.0 | 10.0 | 10.0 | 10.0 | 10.0 |
| Surfactant | KF-351 (made by Shin-Etsu Chemical Co., Ltd.) | 0.8 | 0.8 | 0.8 | 0.8 | 0.0 |
| Photo-acid generator | CPT 100p (made by San-Apro Limited) | 3.0 | 3.0 | 3.0 | 3.0 | 3.0 |
| Sensitizer | DEA (made by Kawasaki Kasei Cemicals, Ltd.) | 0.5 | 0.5 | 0.5 | 0.5 | 0.5 |

TABLE 3

| Actinic radiation curable ink composition 3 | Viscosity of each color ink: | K | C | M | Y | W |
|---|---|---|---|---|---|---|
| | | Pigment No. | | | | |
| (radical polymerization) | 19 to 22 mPa · s (at 25° C.) | 6 | 7 | 8 | 9 | 10 |
| Pigment dispersion | | 12.5 | 12.5 | 21.0 | 15.0 | 40.0 |
| Polymerizable compound | N-vinyl-ϵ-caprolactone | 25.0 | 25.0 | 25.0 | 25.0 | 20.0 |
| Polymerizable compound | Tridecyl acrylate | 30.0 | 30.0 | 30.0 | 30.0 | 20.0 |
| Polymerizable compound | Tetraethylene glycol diacrylate | 18.8 | 18.8 | 10.3 | 16.3 | 8.3 |
| Polymerizable compound | Dipentaerythritol pentaacrylate | 5.0 | 5.0 | 5.0 | 5.0 | 3.0 |
| Sensitizer | Isopropylthioxanthone | 1.0 | 1.0 | 1.0 | 1.0 | 1.0 |
| Surfactant | KF-351 (made by Shin-Etsu Chemical Co., Ltd.) | 0.8 | 0.8 | 0.8 | 0.8 | 0.8 |
| Photo-radical initiator | Irgacure 184 (made by Ciba Japan K.K.) | 2.0 | 2.0 | 2.0 | 2.0 | 2.0 |
| Photo-radical initiator | Irgacure 369 (made by Ciba Japan K.K.) | 2.0 | 2.0 | 2.0 | 2.0 | 2.0 |
| Photo-radical initiator | TPO-L(BASF) | 3.0 | 3.0 | 3.0 | 3.0 | 3.0 |

TABLE 4

| Actinic radiation | Viscosity of each color ink: | K | C | M | Y |
|---|---|---|---|---|---|
| | | Pigment No. | | | |
| curable ink composition 4 | 15 to 18 mPa · s (at 25° C.) | 1 | 2 | 4 | 3 |
| Pigment dispersion | | 12.5 | 12.5 | 21.0 | 15.0 |
| Polymerizable compound | Butyl methacrylate(made by Nippon Shokubai Co., Ltd.) | 20.0 | 20.0 | 15.0 | 15.0 |

TABLE 4-continued

| Actinic radiation | Viscosity of each color ink: | K | C | M | Y |
|---|---|---|---|---|---|
| | | Pigment No. | | | |
| curable ink composition 4 | 15 to 18 mPa · s (at 25° C.) | 1 | 2 | 4 | 3 |
| Polymerizable compound | 1,4-cyclohaxanedimehtanol divinyl ether (made by Nippon Carbide Industries Co., Inc.) | 45.0 | 45.0 | 40.0 | 45.0 |
| Polymerizable compound | CELOXIDE 2021P (made by Daicel Chemical Industries, Ltd.) | 9.0 | 9.0 | 10.5 | 11.5 |
| Polymerizable compound | Propylene carbonate | 10.0 | 10.0 | 10.0 | 10.0 |
| Surfactant | KF-351 (made by Shin-Etsu Chemical Co., Ltd.) | 0.03 | 0.03 | 0.03 | 0.03 |
| Photo-acid generator | CPI 100P (made by San-Apro Limited) | 3.0 | 3.0 | 3.0 | 3.0 |
| Sensitizer | DEA (made by Kawasaki Kasei Chemicals, Ltd.) | 0.5 | 0.5 | 0.5 | 0.5 |

[Method for Forming Ink-Jet Images]

Each of Ink Compositions, prepared as above, was loaded into an ink-jet recorder provided with piezo type ink-jet nozzles, which was constituted as shown in FIG. 1 and FIG. 2. Then image recording was continuously performed on a white PET recording material having a size of 300 mm wide and 500 m long (made by Maruu Setchaku Ltd.) using with a combination of a treating solution containing no colorant and an actinic radiation curable ink as listed in Table 4. As a comparison, image samples were prepared by using only an ink having a colorant and without using a treating solution containing no colorant.

TABLE 5

| Sample No. | Treating solution | Exposure of light after applying treating solution prior to applying actinic radiation curable ink | Type of actinic radiation curable ink containing colorant | Density of ink ejection, Volume of one ink droplet | Type of recording method | Remarks |
|---|---|---|---|---|---|---|
| 1 | PI-1 | Applying exposure(VZero270) | Ink Composition 1 | 1440 × 1440 dpi 2pL | *1 | Inv. |
| 2 | PI-2 | Applying exposure(VZero270) | Ink Composition 1 | 1440 × 1440 dpi 2pL | *1 | Inv. |
| 3 | PI-3 | Applying exposure(VZero270) | Ink Composition 1 | 1440 × 1440 dpi 2pL | *1 | Inv. |
| 4 | PI-4 | Applying exposure(VZero270) | Ink Composition 1 | 1440 × 1440 dpi 2pL | *1 | Inv. |
| 5 | PI-5 | Applying exposure(VZero270) | Ink Composition 1 | 1440 × 1440 dpi 2pL | *1 | Inv. |
| 6 | PI-6 | Applying exposure(VZero270) | Ink Composition 1 | 1440 × 1440 dpi 2pL | *1 | Inv. |
| 7 | PI-7 | Applying exposure(VZero270) | Ink Composition 1 | 1440 × 1440 dpi 2pL | *1 | Inv. |
| 8 | PI-8 | Applying exposure(VZero270) | Ink Composition 1 | 1440 × 1440 dpi 2pL | *1 | Inv. |
| 9 | PI-1 | Applying exposure(VZero270) | Ink Composition 2 | 1440 × 1440 dpi 2pL | *1 | Inv. |
| 10 | PI-2 | Applying exposure(VZero270) | Ink Composition 2 | 1440 × 1440 dpi 2pL | *1 | Inv. |
| 11 | PI-3 | Applying exposure(VZero270) | Ink Composition 2 | 1440 × 1440 dpi 2pL | *1 | Inv. |
| 12 | PI-4 | Applying exposure(VZero270) | Ink Composition 2 | 1440 × 1440 dpi 2pL | *1 | Inv. |
| 13 | PI-5 | Applying exposure(VZero270) | Ink Composition 2 | 1440 × 1440 dpi 2pL | *1 | Inv. |
| 14 | PI-6 | Applying exposure(VZero270) | Ink Composition 2 | 1440 × 1440 dpi 2pL | *1 | Inv. |
| 15 | PI-7 | Applying exposure(VZero270) | Ink Composition 2 | 1440 × 1440 dpi 2pL | *1 | Inv. |
| 16 | PI-8 | Applying exposure(VZero270) | Ink Composition 2 | 1440 × 1440 dpi 2pL | *1 | Inv. |
| 17 | P-1 | Applying exposure(VZero270) | Ink Composition 3 | 1440 × 1440 dpi 2pL | *1 | Comp. |
| 18 | P-2 | Applying exposure(VZero270) | Ink Composition 3 | 1440 × 1440 dpi 2pL | *1 | Comp. |
| 19 | P-3 | Applying exposure(VZero270) | Ink Composition 3 | 1440 × 1440 dpi 2pL | *1 | Comp. |
| 20 | P-4 | Applying exposure(VZero270) | Ink Composition 3 | 1440 × 1440 dpi 2pL | *1 | Comp. |
| 21 | P-5 | Applying exposure(VZero270) | Ink Composition 3 | 1440 × 1440 dpi 2pL | *1 | Comp. |
| 22 | P-6 | Applying exposure(VZero270) | Ink Composition 3 | 1440 × 1440 dpi 2pL | *1 | Comp. |
| 23 | P-7 | Applying exposure(VZero270) | Ink Composition 1 | 1440 × 1440 dpi 2pL | *1 | Comp. |
| 24 | P-8 | Applying exposure(VZero270) | Ink Composition 1 | 1440 × 1440 dpi 2pL | *1 | Comp. |
| 25 | P-7 | Applying exposure(VZero270) | Ink Composition 2 | 1440 × 1440 dpi 2pL | *1 | Comp. |
| 26 | P-8 | Applying exposure(VZero270) | Ink Composition 2 | 1440 × 1440 dpi 2pL | *1 | Comp. |
| 27 | P-9 | Applying exposure(VZero270) | Ink Composition 3 | 1440 × 1440 dpi 2pL | *1 | Comp. |
| 28 | PI-1 | No applying exposure | Ink Composition 1 | 1440 × 1440 dpi 2pL | *1 | Comp. |
| 29 | PI-2 | No applying exposure | Ink Composition 1 | 1440 × 1440 dpi 2pL | *1 | Comp. |
| 30 | PI-1 | No applying exposure | Ink Composition 2 | 1440 × 1440 dpi 2pL | *1 | Comp. |
| 31 | PI-2 | No applying exposure | Ink Composition 2 | 1440 × 1440 dpi 2pL | *1 | Comp. |
| 32 | P-5 | No applying exposure | Ink Composition 3 | 1440 × 1440 dpi 2pL | *1 | Comp. |
| 33 | P-6 | No applying exposure | Ink Composition 3 | 1440 × 1440 dpi 2pL | *1 | Comp. |
| 34 | PI-1 | Applying exposure(VZero270) | Ink Composition 4 | 1440 × 1440 dpi 2pL | *1 | Inv. |
| 35 | PI-2 | Applying exposure(VZero270) | Ink Composition 4 | 1440 × 1440 dpi 2pL | *1 | Inv. |
| 36 | PI-3 | Applying exposure(VZero270) | Ink Composition 4 | 1440 × 1440 dpi 2pL | *1 | Inv. |
| 37 | PI-4 | Applying exposure(VZero270) | Ink Composition 4 | 1440 × 1440 dpi 2pL | *1 | Inv. |
| 38 | PI-5 | Applying exposure(VZero270) | Ink Composition 4 | 1440 × 1440 dpi 2pL | *1 | Inv. |
| 39 | PI-6 | Applying exposure(VZero270) | Ink Composition 4 | 1440 × 1440 dpi 2pL | *1 | Inv. |
| 40 | PI-7 | Applying exposure(VZero270) | Ink Composition 4 | 1440 × 1440 dpi 2pL | *1 | Inv. |
| 41 | PI-8 | Applying exposure(VZero270) | Ink Composition 4 | 1440 × 1440 dpi 2pL | *1 | Inv. |
| 42 | no colorant | Applying exposure(VZero270) | Ink Composition 4 | 1440 × 1440 dpi 2pL | *1 | Comp. |
| 43 | PI-1 | Applying exposure(VZero270) | Ink Composition 4 | 1440 × 1440 dpi 2pL | *2 | Inv. |
| 44 | PI-2 | Applying exposure(VZero270) | Ink Composition 4 | 1440 × 1440 dpi 2pL | *2 | Inv. |

TABLE 5-continued

| Sample No. | Treating solution | Exposure of light after applying treating solution prior to applying actinic radiation curable ink | Type of actinic radiation curable ink containing colorant | Density of ink ejection, Volume of one ink droplet | Type of recording method | Remarks |
|---|---|---|---|---|---|---|
| 45 | PI-3 | Applying exposure(VZero270) | Ink Composition 4 | 1440 × 1440 dpi 2pL | *2 | Inv. |
| 46 | PI-4 | Applying exposure(VZero270) | Ink Composition 4 | 1440 × 1440 dpi 2pL | *2 | Inv. |
| 47 | PI-5 | Applying exposure(VZero270) | Ink Composition 4 | 1440 × 1440 dpi 2pL | *2 | Inv. |
| 48 | PI-6 | Applying exposure(VZero270) | Ink Composition 4 | 1440 × 1440 dpi 2pL | *2 | Inv. |
| 49 | PI-7 | Applying exposure(VZero270) | Ink Composition 4 | 1440 × 1440 dpi 2pL | *2 | Inv. |
| 50 | PI-8 | Applying exposure(VZero270) | Ink Composition 4 | 1440 × 1440 dpi 2pL | *2 | Inv. |
| 51 | no colorant | Applying exposure(VZero270) | Ink Composition 4 | 1440 × 1440 dpi 2pL | *2 | Comp. |
| 52 | PI-4 | Applying exposure(VZero270) | Ink Composition 1 | 720 × 720 dpi 14pL | *2 | Inv. |
| 53 | PI-6 | Applying exposure(VZero270) | Ink Composition 1 | 720 × 720 dpi 14pL | *2 | Inv. |
| 54 | PI-4 | Applying exposure(VZero270) | Ink Composition 4 | 720 × 720 dpi 14pL | *2 | Inv. |
| 55 | PI-6 | Applying exposure(VZero270) | Ink Composition 4 | 720 × 720 dpi 14pL | *2 | Inv. |
| 56 | P-3 | Applying exposure(VZero270) | Ink Composition 3 | 720 × 720 dpi 14pL | *2 | Comp. |
| 57 | P-4 | Applying exposure(VZero270) | Ink Composition 3 | 720 × 720 dpi 14pL | *2 | Comp. |
| 58 | P-9 | Applying exposure(VZero270) | Ink Composition 3 | 720 × 720 dpi 14pL | *2 | Comp. |

*1: Line recording, Inv.: The present invention, Comp.: Comparison
*2: Serial (shuttle) recording, Inv.: The present invention, Comp.: Comparison The image data used for forming image were as follows: "N5·Bicycle" taken from "High definition color digital standard image data" (published in December 1995 by Japanese Standard Association (juridical foundation); solid characters having a size of 4 pt; outline characters having a size of 4 pt; and solid image using each color ink. The ink feeding system was composed of an ink tank, a feeding pipe, a pre-chamber ink tank just prior to the head, piping with filters, and piezo heads, and the portion from the pre-chamber tank to the heads was heated to 45° C. The piezo head was driven so that 2 pl size dots were ejected at a resolution of 1440×1440 dpi and each ink was continuously ejected. After deposition of the ink droplets on the recording material, ultraviolet radiation was instantly (less than 2 second after deposition) irradiated employing each of the radiation lamp units, which were arranged in the downstream direction of the transportation of the recording material, whereby the ink was cured. The treating solution containing no colorant was imagewise applied (only on the image portion) (applied amount was 1.5 g/$m^2$). The transporting speed of the recording material for printing was 50 m/min.

In the same manner as above, Ink Composition 4 and the photo-acid generator solution, prepared as above, were loaded on an ink-jet recorder having a structure shown in FIGS. 3 and 4. Then printing was performed. The recording head carriage was scanned with a speed of 830 mm/s. Further, printing was conducted so as to achieve a resolution of 720×720 dpi by using a droplet of 14 pl, and.

The used lamps were as follows:

VZero 270: a metal halide lamp made by Integration Technologies Co., Ltd, using a H bulb, having a maximum luminance of 400 mW/$cm^2$ (measured with 365 nm sensor UVPF-A1, made by Iwasaki Electric Co., Ltd.)

LED: multiple array composed of 365 nm tips made by Nichia Corporation, water-cooling type, having a maximum luminance of 1,500 mW/$cm^2$ (measured with 365 nm sensor UVPF-A1, made by Iwasaki Electric Co., Ltd.)

<Evaluation of Appearance of White Lines in Solid Image>

Appearance of white lines (image default having a line shape) in the portion of a solid image produced by coalescence of dots was evaluated in accordance with the criteria as follows.

A: No appearance of white line

B: Appearance of one or two white lines

C: Appearance of three or more white lines

<Quality of Characters>

Reproduction property of solid characters of a size of 4 pt and outline characters of a size of 4 pt were evaluated in accordance with the criteria as follows.

A: Both solid characters and outline characters can be clearly reproduced.

B: Outline characters are slightly deformed, but they can be permitted for practical use.

C: Both solid characters and outline characters are deformed and they cannot be permitted for practical use. (Coalescence of dots occurs both in solid characters and outline characters and it is hard to recognize the shape of characters.)

<Quality of Image>

Color mixing, yellowing and curing of the printed material were visually inspected and were evaluated in accordance with the criteria as follows.

A: No color mixing is observed and an image of high quality is formed. Further, no yellowing and no curing are observed.

B: Color mixing is slightly observed in the high density portion of an image, however, it can be permitted for practical use. Further, no yellowing and no curing are observed.

C: Slight color mixing is observed in the high density portion of an image, or high yellowing or strong curing is observed. It cannot be permitted for practical use.

D: Extensive color mixing is observed and it cannot be permitted for practical use.

TABLE 6

| Sample No. | White line | Quality of characters | Quality of image | Remarks |
|---|---|---|---|---|
| 1 | A | A | B | |
| 2 | A | A | B | |
| 3 | A | A | B | |
| 4 | A | B | A | |
| 5 | A | B | A | |
| 6 | B | A | A | |
| 7 | B | A | A | |
| 8 | B | A | A | |
| 9 | A | A | A | |
| 10 | A | A | A | |
| 11 | A | A | A | |
| 12 | A | A | A | |
| 13 | A | A | A | |
| 14 | A | A | A | |

TABLE 6-continued

| Sample No. | White line | Quality of characters | Quality of image | Remarks |
|---|---|---|---|---|
| 15 | A | A | A | |
| 16 | A | A | A | |
| 17 | A | B | C | Image portion is thick and the print is curled |
| 18 | A | B | C | Image portion is thick and the print is curled |
| 19 | B | B | C | Image portion is thick and the print is curled Yellowing in image portion is intense |
| 20 | C | B | C | |
| 21 | C | B | C | |
| 22 | C | B | C | |
| 23 | B | B | C | Image portion is thick and the print is curled |
| 24 | B | B | C | Image portion is thick and the print is curled |
| 25 | B | B | C | Image portion is thick and the print is curled |
| 26 | B | B | C | Image portion is thick and the print is curled |
| 27 | C | C | C | |
| 28 | C | B | B | |
| 29 | C | B | B | |
| 30 | C | B | B | |
| 31 | C | B | B | |
| 32 | C | C | B | |
| 33 | C | C | B | |
| 34 | A | A | A | |
| 35 | A | A | A | |
| 36 | A | A | A | |
| 37 | A | A | A | |
| 38 | A | A | A | |
| 39 | A | A | A | |
| 40 | A | A | A | |
| 41 | A | A | A | |
| 42 | C | C | A | |
| 43 | A | A | A | |
| 44 | A | A | A | |
| 45 | A | A | A | |
| 46 | A | A | A | |
| 47 | A | A | A | |
| 48 | A | A | A | |
| 49 | A | A | A | |
| 50 | A | A | A | |
| 51 | B | B | A | |
| 52 | B | B | A | |
| 53 | B | B | A | |
| 54 | B | B | A | |
| 55 | B | B | A | |
| 56 | C | C | C | Image portion is thick and the print is curled Yellowing in image portion is intense |
| 57 | C | C | B | |
| 58 | C | C | C | Yellowing in image portion is intense |

From the results shown in Table 6, it was revealed that the printed samples of the present invention did not produce white lines because they did not yield coalescence of dots. It was proved that the printed samples of the present invention produced high quality images enabling to produce characters of high quality. In addition, the effects of the composition of the present invention were remarkable compared with comparative samples when a line recording method was employed.

What is claimed is:

1. A method for forming an image with an ink-jet recorder provided with an ink-jet head, the method comprising the following steps in the sequence set forth:

ejecting a photo-acid generator solution through the ink-jet head on a recording material, provided that the photo-acid generator solution contains a cyclic ester solvent and a photo-acid generator without containing a photo-polymerizable compound;

irradiating the ejected photo-acid generator solution on the recording material with actinic radiation rays;

ejecting an actinic radiation curable ink containing a colorant through the ink-jet head on the recording material to form an image; and irradiating the image with actinic radiation rays so as to fix the formed image.

2. The method described in claim 1, wherein the photo-acid generator solution has a viscosity of 1 to 13 mPa·s measured at 25° C.; and the actinic radiation curable ink has a viscosity of 15 to 50 mPa·s measured at 25° C.

3. The method described in claim 1, wherein the photo-acid generator is represented by Formula (1) or Formula (2):

Formula (1)

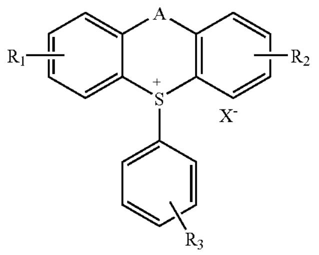

Formula (2)

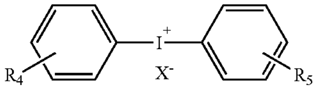

wherein, A represents S, O or CO; $R_1$ and $R_2$ each independently represent H, a straight alkyl group or a branched alkyl group having 1 to 6 carbon atoms, a cycloalkyl group, an alkoxyl group, a hydroxyl group, a halogen atom; an alkylthio group, and an arylthio group; $R_3$ to $R_5$ each independently represent a straight alkyl group or a branched alkyl group having 1 to 6 carbon atoms, an alkoxyl group, an aryl group which may have a substituent, a hydroxyl group, a halogen atom; and X represents $SbF_6$, $PF_6$, $AsF_6$, $BF_4$, or the following group:

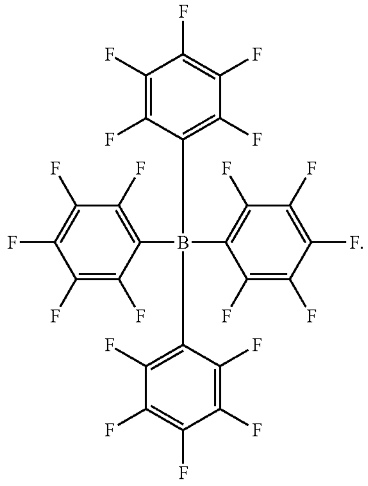

4. The method described in claim 1, wherein an ejected amount of the photo-acid generator solution on the recording material is from 0.5 to 4.0 $g/m^2$.

5. The method described in claim 1, wherein the ink-jet recorder uses a line recording method and the method comprising the following steps in the sequence set forth:

imagewise ejecting the photo-acid generator solution through the ink-jet head on the recording material;

irradiating the imagewise ejected photo-acid generator solution on the recording material with actinic radiation rays;

ejecting the actinic radiation curable ink containing a colorant through the ink-jet head to the recording material to form an image, provided that an amount of the ejected actinic radiation curable ink is from 0.1 to 4.0 pl; and irradiating the image with actinic radiation rays so as to fix the formed image.

6. The method for forming an image of claim 1, wherein the cyclic ester solvent is selected from the group consisting of β-propiolactone, β-butyrolactone, α-methyl-β-butyrolactone, γ-butyrolactone, γ-valerolactone, δ-valerolactone, ε-caprolactone, γ-caprolactone, γ-heptanolactone and propylene carbonate.

* * * * *